(12) United States Patent
Aloni et al.

(10) Patent No.: US 6,965,917 B1
(45) Date of Patent: Nov. 15, 2005

(54) SYSTEM AND METHOD FOR NOTIFICATION OF AN EVENT

(75) Inventors: Eran Aloni, Modi'in (IL); Amos Arev, Savyon (IL)

(73) Assignee: Comverse Ltd., Tel Aviv (IL)

( * ) Notice: Subject to any disclaimer, the term of this patent is extended or adjusted under 35 U.S.C. 154(b) by 0 days.

(21) Appl. No.: 09/475,147

(22) Filed: Dec. 30, 1999

Related U.S. Application Data (60) Provisional application No. 60/152,362, filed on Sep. 7, 1999.

(51) Int. Cl.[7] ............................................. G06F 15/16
(52) U.S. Cl. ...................... 709/206; 709/205; 709/207
(58) Field of Search ................................ 709/224, 223, 709/227, 203–207, 216–219

(56) References Cited

U.S. PATENT DOCUMENTS

| | | | | |
|---|---|---|---|---|
| 4,837,798 | A | | 6/1989 | Cohen et al. |
| 5,813,007 | A | * | 9/1998 | Nielsen ........................ 707/10 |
| 5,850,519 | A | | 12/1998 | Vazana |
| 5,944,786 | A | * | 8/1999 | Quinn ..................... 380/88.12 |
| 5,951,648 | A | * | 9/1999 | Kailash ...................... 709/237 |
| 6,094,681 | A | * | 7/2000 | Shaffer et al. .............. 709/206 |
| 6,138,149 | A | * | 10/2000 | Ohmura ........................ 705/26 |
| 6,167,448 | A | * | 12/2000 | Hemphill et al. ......... 707/501.1 |
| 6,181,928 | B1 | * | 1/2001 | Moon ....................... 379/88.12 |
| 6,226,668 | B1 | * | 5/2001 | Silverman ................... 709/204 |
| 6,320,941 | B1 | * | 11/2001 | Tyroler .................... 379/93.24 |
| 6,389,276 | B1 | * | 5/2002 | Brilla et al. ................ 455/413 |
| 6,400,810 | B1 | * | 6/2002 | Skladman et al. ........ 379/93.24 |
| 6,421,707 | B1 | * | 7/2002 | Miller et al. ................ 709/206 |
| 6,421,708 | B2 | * | 7/2002 | Bettis ......................... 709/206 |
| 6,484,196 | B1 | * | 11/2002 | Maurille ..................... 709/206 |
| 6,535,586 | B1 | * | 3/2003 | Cloutier et al. .......... 379/89.13 |

OTHER PUBLICATIONS

RFC 2060's, http://freesoft.org/CIE/RFC/Orig/rfc2060.txt, M. Crispin, University of Washington, Dec. 1996.
uReach.com's, http://www.uReach.com, copyright 1998-9.

* cited by examiner

*Primary Examiner*—Glenton B. Burgess
*Assistant Examiner*—Yasin Barqadle
(74) *Attorney, Agent, or Firm*—Sughrue Mion, PLLC (57) ABSTRACT

A method and a system for notifying a subscriber of the occurrence of an event, which may be a messaging event, in which a message is received by a messaging service associated with the particular subscriber; or a non-messaging event, such as the occurrence of a particular stock price. For example, an e-mail message is optionally received by the mailbox of the subscriber, which is detected by the notification request sender according to the present invention. The notification request sender then prepares a notification request according to a standard network protocol, such as HTTP for example, for transmission to a notification server for the subscriber. This server parses the notification request, and notifies the subscriber with a message according to a particular messaging service, such as an SMS (short message system) message sent to a cellular telephone of the subscriber, for example. Optionally and preferably, if a plurality of such messaging systems for notifying the subscriber is available, then the notification server determines the best messaging system or systems for notifying the subscriber, for example according to the preference of the subscriber.

35 Claims, 5 Drawing Sheets

Figure 3 (con't)

Figure 4

SYSTEM AND METHOD FOR NOTIFICATION OF AN EVENT

This is a Continuation-in-Part Application of U.S. Provisional Application No. 60/152,362, filed on Sep. 7, 1999.

FIELD AND BACKGROUND OF THE INVENTION

The present invention relates to a system and method for providing a notification protocol for network clients, and in particular, for such a system and method in which the notification protocol uses only standard network communication protocols for detecting the event and performing the notification, such that the system and method could be easily used for different types of networks, and such that the system and method could be used for notification across these different networks.

A notification service enables a subscriber to ascertain whether certain events have occurred, which may be messaging events such as the receipt of an e-mail (electronic mail) message, or other types of messages, such as a voice mail message for example, by the subscriber; or which may be non-messaging events, such as the occurrence of a particular stock price, for example. Currently, a unified notification service for different types of message data does not exist. For example, if a subscriber operates different messaging systems such as those for voice mail and e-mail messages, the subscriber cannot monitor the status of received messages through a single notification service.

Although notification services do exist for e-mail messages, such services are limited in extent. For example, the IMAP4 e-mail network protocol standard, defined in RFC 2060 of the network standards working group, allows for server notification, but does not require such notification to be performed. Furthermore, the IMAP4 network protocol can only be used by an e-mail system client to review the presence (or absence) of messages on a local e-mail system server, but cannot be used to report different types of messaging events for different types of messaging data, nor can it be used to report events in non-messaging systems. Also, the IMAP4 network protocol has the additional disadvantage of requiring an open session to be maintained between the messaging client and the messaging server.

Another example of an attempted solution is disclosed in U.S. Pat. No. 5,850,519, which describes a system in which an e-mail message is sent from one subscriber to another subscriber through a host computer. The host computer then notifies the recipient subscriber of the receipt of the e-mail message by placing a telephone call through the PSTN (public switched telephone network). However, such a system requires all e-mail messages to pass through the host computer, and as such, is similar to other notification systems which are known in the art (see background art FIG. 1 below for further details). In addition, this system requires the use of a call intercept unit, which is a specialized hardware device attached to a telephone, and which intercepts and identifies incoming telephone calls. Thus, the disclosed system fails to provide a universal solution, which does not require specialized hardware.

A company called uReach.com (http://www.uReach.com as of Dec. 9, 1999) has also attempted to provide a solution, in the form of a "national communications service". This service allows subscribers to retrieve e-mail messages and voice messages through a voice telephone call. In addition, the service sends specific reminders about appointments in the calendar of the subscriber, for example. However, the service does not provide notification of events occurring in multiple event generating systems, since for example the subscriber is not notified of the receipt of a new e-mail message, but only of events described on the calendar stored at the server of uReach.com. Thus, the disclosed service cannot handle events which occur in event generating systems that are not directly connected to the server of uReach.com, and as such, resembles the disclosed system of U.S. Pat. No. 5,850,519.

A more useful solution would enable a subscriber to receive notifications of the receipt of messages from multiple messaging applications, or of other events generated by other event-generating systems, without requiring that the subscriber be connected to the particular event generating system, or even on the same network as the event-generating system. Such a notification would be received according to standard network protocols, which would preferably be incorporated into the e-mail message server, or other type of event-generating system, itself, rather than through a stand-alone additional server. Also, such notification service would preferably not require an open session to be maintained between the notification server and the event-generating system. Unfortunately, such a notification service does not exist.

There is thus a need for, and it would be useful to have, a system and a method for providing a notification service which would enable the subscriber to determine whether a particular type of event has occurred, without requiring that the event generating system be connected to the same internal network or system as the notification service system itself, yet while using standard network protocols for communication between the notification service system and the event generating system, such that the notification service system can be a separate and independently determined system from the event generating system.

BRIEF DESCRIPTION OF THE DRAWINGS

The foregoing and other objects, aspects and advantages will be better understood from the following detailed description of a preferred embodiment of the invention with reference to the drawings, wherein.

SUMMARY OF THE INVENTION

The present invention is of a method and a system for notifying a subscriber of the occurrence of an event, which may be a messaging event, in which a message is received by a messaging service associated with the particular subscriber; or a non-messaging event, such as the occurrence of a particular stock price. For example, an e-mail message could be received by the mailbox of the subscriber, which would be detected by the notification request sender according to the present invention. The notification request sender would then prepare a notification request according to a standard network protocol, such as HTTP for example, for transmission to a notification server for the subscriber. This server would then parse the notification request, and notify the subscriber with a message according to a particular messaging service, such as an SMS (short message system) message sent to a cellular telephone of the subscriber, for example. Optionally and preferably, if a plurality of such messaging systems for notifying the subscriber is available, then the notification server determines the best messaging system or systems for notifying the subscriber, for example according to the preference of the subscriber.

Also optionally, the message sent to notify the subscriber could itself be the messaging event, in that an additional message or other event does not need to exist. Instead, a user may wish to transmit a message to a subscriber for whom the mechanism for sending a message, such as an e-mail address, is not known, for example, and would therefore transmit the message directly to the notification server for the subscriber. As described in further detail below with regard to FIG. 4, such a direct transmission is optionally performed through a Web page, which would receive information from the requesting user, and from which information is sent directly to the notification request server. The notification request sender would then determine the best messaging mechanism for notifying the subscriber, and would notify the subscriber accordingly.

The notification system according to the present invention includes an event generating system, a notification request sender and a notification server. The event generating system is the system in which the events occur, while the notification request sender is responsible for "translating" these events into notification requests which comply with the notification protocol. The notification server then receives the notification request from the notification request sender, and notifies the subscriber of the occurrence of the event.

According to the present invention, there is provided a system for notifying a subscriber upon an occurrence of an event, the system comprising: (a) an event-generating system for generating the event; (b) a notification request sender for detecting the occurrence of the event and for preparing a notification request according to an open network protocol; and (c) a notification server for receiving the notification request from the notification request sender, and for notifying the subscriber of the occurrence of the event, wherein the notification server is not in direct communication with the event generating system.

According to another embodiment of the present invention, there is provided a method for notifying a subscriber upon an occurrence of an event in an event-generating system, the method comprising: (a) providing a notification server; (b) detecting the occurrence of the event at the event-generating system; (c) preparing a notification request according to an open network protocol; (d) transmitting the notification request to the notification server; and (e) notifying the subscriber of the occurrence of the event according to the notification request.

According to yet another embodiment of the present invention, there is provided a method for sending a message to a subscriber by a requesting user, the method comprising: (a) providing a notification server; (b) requesting a notification of the subscriber by the requesting user, wherein the requesting user does not select a notification mechanism for notifying the subscriber; (c) sending the notification to the notification server; (d) selecting the notification mechanism for notifying the subscriber by the notification server; and (e) sending the notification to the subscriber through the notification mechanism by the notification server.

According to still another embodiment of the present invention, there is provided a system for notifying a subscriber, comprising: (a) an event generating system; (b) a notification request sender connected to the event generating system; and (c) a notification server in communication with the notification request sender, such that the notification server notifies the subscriber. Hereinafter, the term "open network protocol" refers to any openly available network protocol, based on a standard protocol, including but not limited to those network protocols which are determined by a standards body. Hereinafter, the term "openly available" refers to a network protocol which is not the proprietary, exclusive property of a company or other commercial entity.

DETAILED DESCRIPTION OF THE INVENTION

The present invention is of a method and a system for notifying a subscriber of the occurrence of an event, which may be for example a messaging event or a non-messaging event.

One advantage of the system and method according to the present invention is that the notification message is sent according to an open network protocol. Therefore, receiving and parsing such a message does not require any proprietary software or other component, but instead may be performed with extensions to the currently existing network standards.

Another advantage of the present invention is that a message can be transmitted to a subscriber without a requirement for the sending user to know the details of the mechanism used to pass the message to the subscriber. For example, the sending user could send a message directly to the notification server without knowing how that server would send the message to the subscriber and without knowing any other contact information for the subscriber.

As previously described, a non-messaging event is an event which does not involve the transmission of a message to the subscriber, but for which the subscriber had previously requested notification. Examples of such a non-messaging event include, but are not limited to, the occurrence of a particular stock price, the release of a news story, the release of a weather report, a reminder of a meeting or other appointment, a reminder to perform a particular task such as purchasing a birthday present, and so forth.

The principles and operation of a system and a method according to the present invention may be better understood with reference to the drawings and the accompanying description, it being understood that these drawings are given for illustrative purposes only and are not meant to be limiting.

Figure 1:
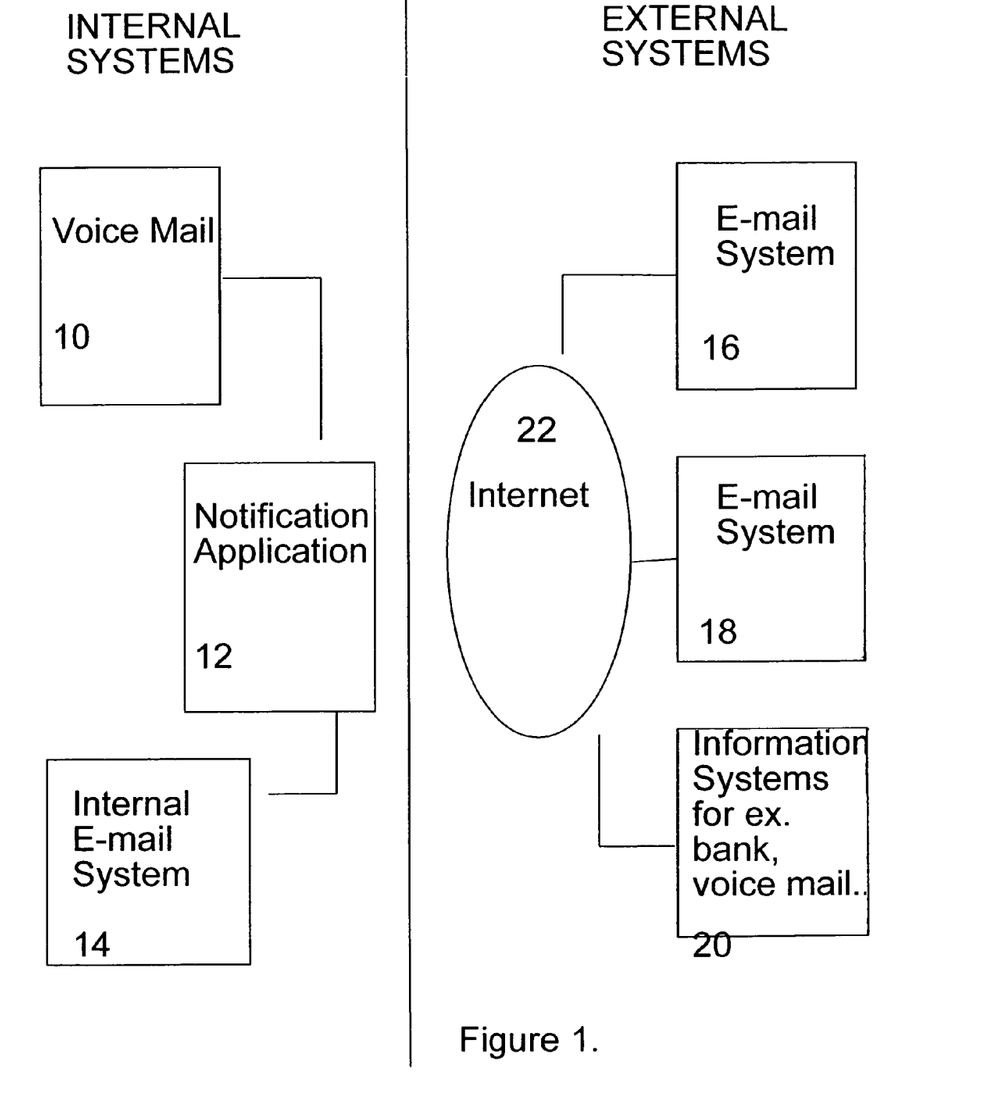
FIG. 1 is a schematic block diagram of a background art system.
Figure 2:
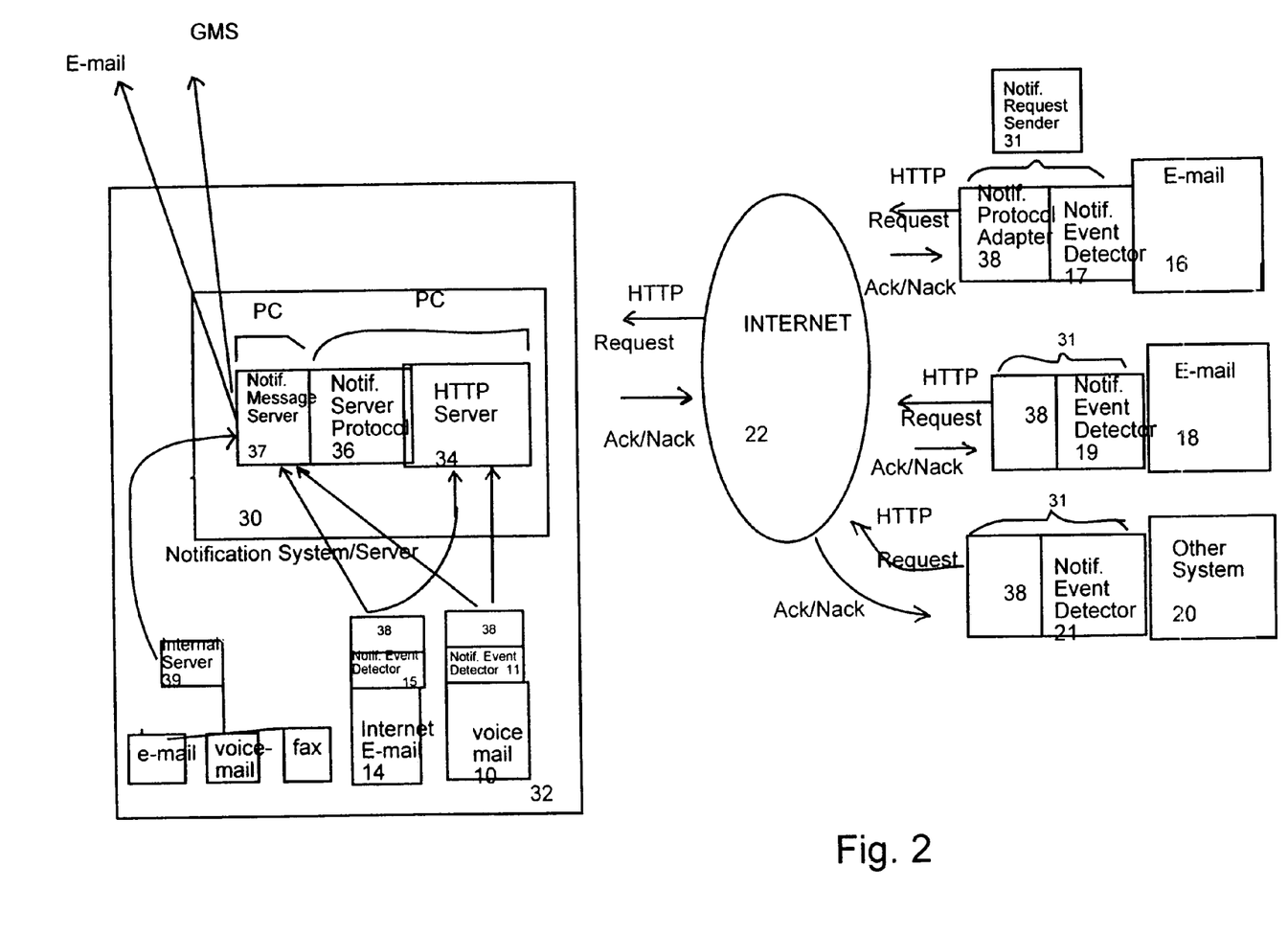
FIG. 2 is a schematic block diagram of an exemplary system according to the present invention.

Referring now to the drawings, FIG. 1 is a schematic block diagram of a background art notification system, while FIG. 2 is a schematic block diagram of a notification system according to the present invention. As shown in the background art system of FIG. 1, a notification system according to the background art must be some type of internal system. By "internal", it is meant that messaging applications, such as a voice mail system 10 and an internal e-mail system 14, must be connected directly to a background art notification server 12, such that all message traffic must therefore flow through background art notification server 12.

By contrast, the subscriber may be located on an external system to the notification service. As shown in background art, a plurality of different exemplary messaging systems are interconnected through a network such as the Internet 22. Such messaging systems may optionally include a first e-mail system 16 and a second e-mail system 18, and a voice mail messaging system 20. Of course, other types of messaging systems could be used in place of these exemplary messaging systems. Furthermore, such external systems could also be event generating systems of other types for which the subscriber wishes to receive a notification, which are not addressed by background art system 10 at all.

These different types of external systems are problematic with regard to background art notification server 12, since background art notification server 12 clearly cannot monitor the messages transmitted through these external messaging systems, nor can background art notification server 12 monitor the occurrence of other types of events in external systems. Therefore, if a subscriber wishes to receive a notification of a message sent to one of these external messaging systems, or of the occurrence of another type of event, notification cannot be provided through background art notification server 12.

By contrast, as shown in FIG. 2, a notification server 30 according to the present invention is able to receive a notification request from a notification request sender 31 which is external to a particular notification service provider 32. Instead, notification request sender 31 is connected to notification server 30 through Internet 22. Notification service provider 32 is a service provider for notification capabilities on events occurring in event-generating systems both within notification service provider 32 and in external systems. Therefore, notification service provider 32 may optionally be a provider of some type of event-generating system, such as an e-mail messaging system. As used with regard to FIG. 2, a "subscriber" is a particular user who wishes to receive notification of a particular event or events, which may be a messaging or a non-messaging event, as previously described.

The flow of communication for such notification is as follows. An event is initially generated by an event-generating system. As shown in FIG. 2, such an event could be a messaging event, generated by first e-mail system 16, second e-mail system 18, and/or voice mail messaging system 20, which are shown as non-limiting examples of such systems. The generated event is then detected by an associated notification event detector for each such system. For example, if the event is the receipt of a new e-mail message by the mailbox of the subscriber at first e-mail system 16 or second e-mail system 18, then the receipt of the message would be detected by a notification event detector 17 or 19, respectively. As another example, if the event is the receipt of a new voice message by voice mail messaging system 20, then the event would be detected by a notification event detector 21.

Each of notification event detectors 17, 19 or 21 preferably detects such a receipt event through a trigger, although any method for sending information from first e-mail system 16, second e-mail system 18, and/or voice mail messaging system 20 to event detectors 17, 19, or 21 could be used. For example, if notification event detector 17 is connected to an SMTP server for first e-mail system 16, then the receipt event is preferably detected according to an SMTP task for incoming e-mail messages addressed to the particular subscriber. The existence of such an incoming e-mail message preferably automatically triggers the detection of such a message by notification event detector 17, for example through a trigger provided by the API (application programming interface) of the particular SMTP server software program. If such a trigger is not provided with the SMTP server software program, an additional software component and/or additional code may be required, which could easily be implemented by one of ordinary skill in the art.

Optionally and more preferably, notification event detector 17 is able to receive more detailed information about the status of a particular subscriber on a particular external messaging system. For example, for first e-mail system 16, optionally and more preferably, notification event detector 17 is able to report on such conditions as the presence of a new e-mail message in the mailbox of the subscriber, whether the mailbox is full, an alert to a system shut-down, and so forth.

In any case, upon detection of the event, each of notification event detectors 17, 19 or 21 would then signal an associated notification protocol adapter 38 that the event had occurred. Notification protocol adapter 38 would then prepare and send a notification request through Internet 22 to notification server 30. The notification request would include information about the event itself, as well as an identifier of the subscriber who should be notified of the occurrence of the event.

Preferably, the notification request would be prepared according to an open network protocol, as previously described, such that notification protocol adapter 38 could be a standard extension to existing software technology, rather than a proprietary solution. For example, HTTP servers which are known in the art include a standard mechanism for adding such an extension by using CGI (common gateway interface) programs. The proprietary Microsoft™ HTTP server (Microsoft Corp., USA) has some other mechanisms, such as ASP (active server pages) and ISAPI (Internet server API). For the purposes of illustration only and without any intention of being limiting, the standard network protocol is described as being HTTP (hyper-text transfer protocol), the protocol which is used to transfer Web page data for displaying documents written in mark-up languages such as HTML (hyper-text mark-up language) by a Web browser. Another exemplary standard network protocol could be SMTP (simple mail transfer protocol) for example.

The notification request would be sent from notification protocol adapter 38 through Internet 22 to a suitable network protocol server at notification server 30, such as an HTTP server 34 if the open network protocol is HTTP, for example. HTTP server 34 then parses the notification request, as described in greater detail below (see FIG. 3). The parsed request is then passed to a notification server protocol adapter 36 which determines whether the notification request is valid and extracts the information contained in the request itself. HTTP server 34 is preferably implemented as a standard HTTP server software component which is installed on a computer, and which could easily be implemented by one of ordinary skill in the art. Notification server protocol adapter 36 is preferably implemented as a software component which is more preferably installed on the same computer as HTTP server 34, and is activated by HTTP server 34 upon receiving a notification request.

The information which is extracted by notification server protocol adapter 36 is then passed to notification messaging server 37, which would determine how the subscriber wishes to be notified, and which would then select a notification mechanism for notifying the subscriber. Notification messaging server 37 then notifies the subscriber according to the selected mechanism, also as described in greater detail with regard to FIG. 3.

The exact nature of the selected mechanism is less important than the ability of the subscriber to determine which mechanism is preferentially used for notification. Also, notification messaging server 37 may optionally not notify the subscriber directly, but rather may pass the notification message to the appropriate messaging system. For example, notification messaging server 37 could pass the notification message to a subscriber through e-mail or as an SMS (short message system) message for a cellular telephone.

In the exemplary system shown, in addition to notification server 30, notification service provider 32 also features internal voice mail service 10 and internal e-mail system 14, which were also shown in background art FIG. 1. Notification service provider 32 is optionally and preferably able to provide notification concerning messaging events at internal voice mail service 10 and internal e-mail system 14 according to one of a plurality of implementations.

In a first implementation, internal voice mail service 10 is connected to a notification event detector 11, while internal e-mail system 14 is connected to a notification event detector 15, both of which are connected to an associated notification protocol adapter 38. As previously described for the external event-generating systems, notification protocol adapter 38 sends a notification request to HTTP server 34 upon detection of an event. The remainder of the process is followed as previously described.

In a second implementation, internal voice mail service 10 and internal e-mail system 14 are both connected directly to an internal server 39, which in turn is connected directly to notification message server 37. This implementation would by-pass the previous steps of sending the notification request according to an open network protocol, but instead would involve the detection of the event by internal server 39. Internal server 39 would detect the event as all such events would pass through internal server 39. Internal server 39 would then directly request notification message server 37 to notify the subscriber.

According to preferred embodiments of the present invention, if the standard network protocol is HTTP, for example, then preferably the notification request is a list of HTTP fields and their values. More preferably, each type of messaging event features a specific list of mandatory fields for which data must be entered in order for the notification request to be sent. Optionally, an additional set of non-mandatory fields may be included in the notification request if desired.

The notification request is then sent according to a standard network protocol, for example by using the GET or POST commands of the HTTP standard. Optionally and preferably, notification server protocol adapter 36 then causes an "ack" (acknowledgment) message to be returned to notification protocol adapter 38 of the external messaging system. More preferably, such an "ack" message is only sent after notification server protocol adapter 36 is certain that the notification request is secure.

Optionally and additionally, but more preferably, notification server protocol adapter 36 can send an additional "ack" message to notification protocol adapter 38 of the external messaging system according to whether the subscriber actually received the notification message. Alternatively, if notification server protocol adapter 36 sends a "nack" (not acknowledged) message to notification protocol adapter 38 because of a technical problem, preferably notification protocol adapter 38 resends the notification request, in order to prevent any such message events to remain unprocessed.

According to preferred embodiments of the present invention, notification server 30 is preferably able to operate in either synchronous or asynchronous mode. In synchronous mode, the client (notification protocol adapter 38) can send a request only after receiving an "ack" or "nack" message concerning the previous request from notification server protocol adapter 36. Alternatively, in asynchronous mode, the client can send requests without waiting for a reply from notification server protocol adapter 36. This requires the generation of a unique client identification tag, which would then be sent with the notification request. The identification tag would then be part of each "ack" or "nack" message sent by notification server protocol adapter 36.

Figure 3:
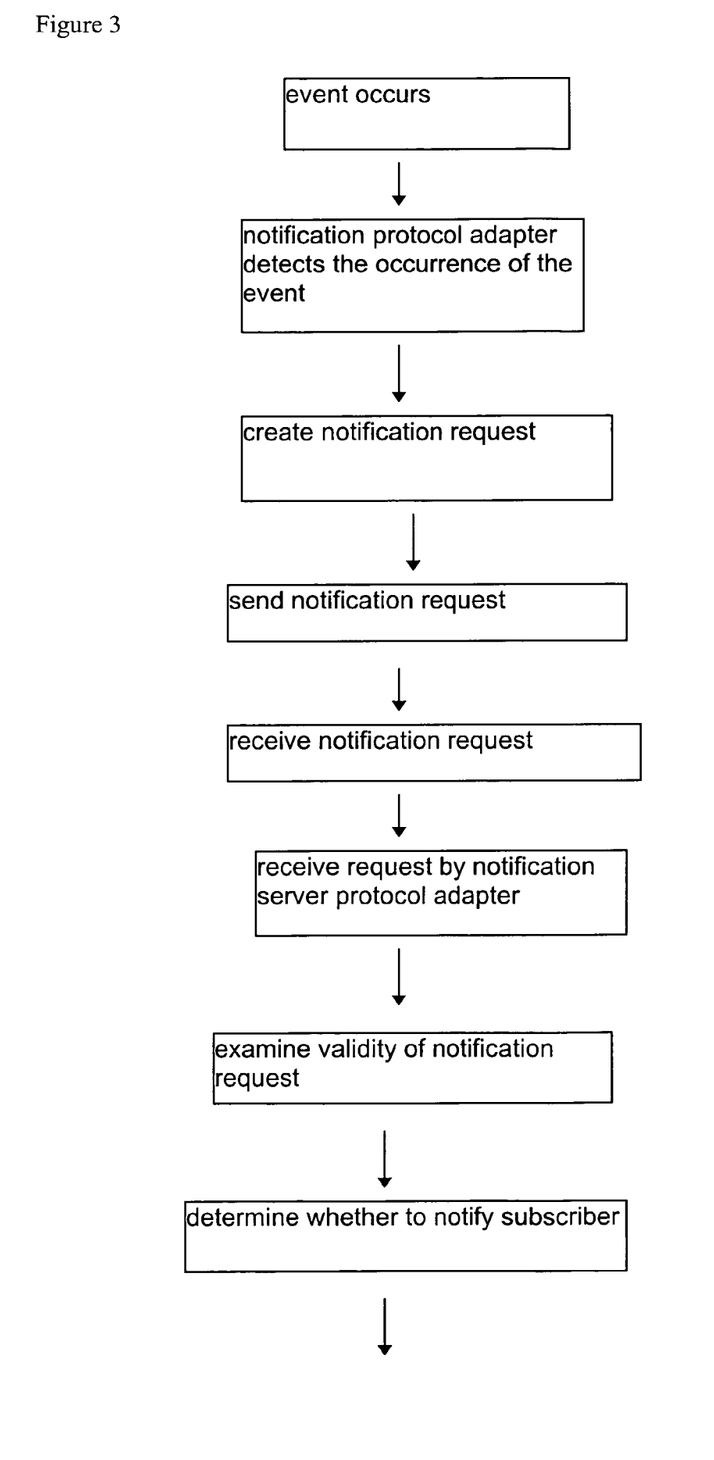
FIG. 3 is a flowchart of an illustrative method for notifying the subscriber of the occurrence of the event according to the present invention.

FIG. 3 is a flowchart of an exemplary method for notifying a subscriber of an event, such as a message event for example. First, the event occurs, as exemplified by the receipt of an e-mail message in the mailbox of the user. Second, the notification protocol adapter detects the occurrence of the event. Third, if the notification protocol adapter determines that such a request should be sent, then the notification protocol adapter creates a notification request. Fourth, the notification protocol adapter sends the notification request.

Since the notification request is preferably given according to the HTTP protocol as the preferred example of the standard network protocol, the notification request preferably features certain HTTP key-value pairs. For example, in order to inform a subscriber that a new message entered the mailbox as the illustrative event, optionally and preferably the following key-value pairs would be given:

www.notification.com/notify.exe?EmailAddress=
recipient@mailserver.com&RequestType=NewMsg&
ServerName=mailserver.com&From=sender@
sendermail.com&subject=Hello+there&To=
recipient@mailserver.com As another example, in order to inform a subscriber that the e-mail mailbox is full, optionally and preferably the following key-value pairs would be given:

www.notification.com/
notify.exe?EmailAddress=recipient@
mailserver.com&RequestType=MailboxFull&
ServerName=
mailserver.com&MailboxCapacity=90&Mailbox
Capacity Threshold=80

Next, the notification request arrives at the HTTP server of the notification server. Then, this server passes the request to the notification server protocol adapter. The notification server protocol adapter then examines the validity of the notification request, and then optionally and preferably transfers the request to the notification message server.

Next, the notification message server processes the notification request and determines whether to send it to the subscriber. If the notification message server decides to notify the subscriber, then this server creates a particular subscriber message to send to the subscriber. The decision as to whether a subscriber message should be sent, as well as the selection of the particular communication mode for sending the message, and optionally the selection of the particular address within that mode if the subscriber has a plurality of such addresses, are all preferably performed according to a decision logic. More preferably, the preferences of the subscriber are used to determine the decision logic, which includes at least one filtering rule. Such a filtering rule incorporates the preferences of the subscriber, for example with regard to preferred notification media types (email, SMS, and so forth.) and default addresses for notification. These filtering rules, with the subscriber preferences, are preferably stored in a database which is in communication with the notification message server.

For example, the notification message server could create an SMS (short message system) message for transmission to the cellular telephone of the subscriber, in order to alert the subscriber as to the existence of the event. Other examples of communication modes which the subscriber is able to select include but are not limited to, e-mail or a telephone voice message. In addition, the decision as to whether the subscriber message should be sent includes the option to determine the time that such a message should be sent. For example, the subscriber is optionally and preferably able to select the time at which the subscriber message should be sent, for example whether a delay is introduced before the subscriber message is sent, or whether a cellular telephone message is delivered after working hours, as another example. As another option, preferably the subscriber is able to select whether a predetermined number of events have occurred before the subscriber message is sent, containing information about this plurality of events.

All of these user preferences are preferably implemented as filtering rules, such that the decision logic is constructed by examining each filtering rule to determine if that rule applies to the notification request, and if so, whether the outcome of the application of the rule is such that the subscriber message should be sent. More preferably, if the outcome is negative for at least one filtering rule, then the subscriber message is not sent immediately, although the message may optionally be sent at a later time. A subscriber may have multiple filing rules to be processed by the notification server. Therefore, the notification server may decide, as a result of processing these filtering rules, to send notification to one or more destinations. If multiple notification messages are sent, each notification message can optionally be sent to another type of output device, such as a telephone or e-mail system. Furthermore, each message can optionally and preferably be delivered at a separate and differently determined time, according to the rules and subscriber preferences.

According to a preferred embodiment of the present invention, if an error occurs during the delivery of a subscriber message, then preferably a retry mechanism is responsible for trying to handle errors in the delivery of a message by attempting to deliver the message again.

Next, the subscriber message is sent to the subscriber. Then, the user receives the subscriber message through the particular communication interface. The user decides whether to act upon the event for which the notification request was originally generated.

According to other embodiments of the present invention, different types of standard network protocols can be used to provide the notification messages, and hence to determine the processing performed by the notification system. For example, optional standard network protocols include, but are not limited to, HTTP, SMTP and FTP. Optional formats for the notification message itself include, but are not limited to, HTTP key-value pairs (as shown above), XML data, and any other textual format, such as a list of nested pairs of key values, for example.

Figure 4:
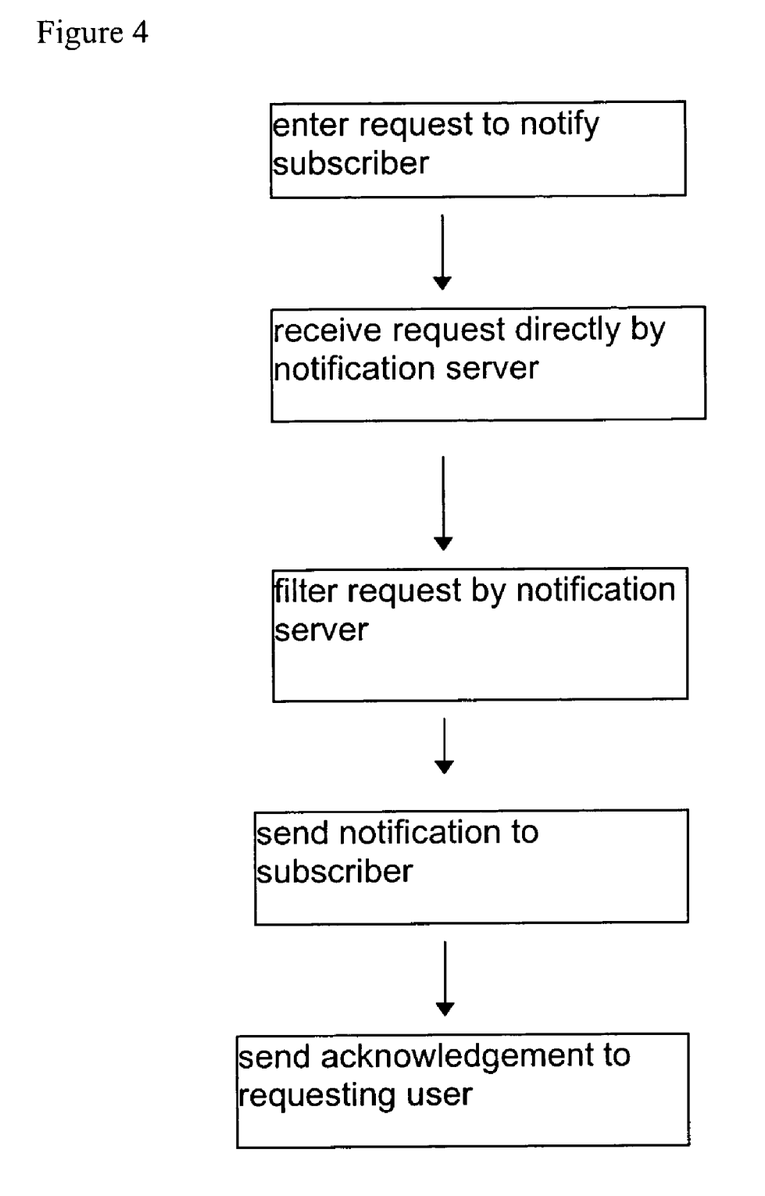
FIG. 4 is a flowchart of an illustrative method for notifying a subscriber by a requesting user without an additional event according to the present invention.

FIG. 4 is a flowchart of another preferred embodiment of the present invention, in which the triggering event for generating the notification request is actually the notification request itself. According to this embodiment, first, a requesting user enters a request to notify the subscriber, for example through a Web page which is actually served by the notification server itself. Such a request could include the name and/or other identifying information for the subscriber, optionally with a short message or other information.

Next, the notification server receives the request directly. Then, the notification server filters the request as for the previously described notification request. In this embodiment, the notification request is the logical name for all the information received by the notification server from the source using the notification protocol of the present invention. During processing the server adds information to the request from the subscriber preferences. For example, at least one filtering rule could be used to determine the particular channel for notification, for example e-mail or a cellular telephone message, as well as the time of notification, for example whether a delay should be introduced before notification.

Next, the notification server sends the subscriber message according to the selected channel, optionally also according to a selected time. Optionally, the requesting user receives a notification acknowledgement that the subscriber message has been sent. Thus, the triggering event is actually the request by the requesting user, without any additional message or non-message event.

It will be appreciated that the above descriptions are intended only to serve as examples, and that many other embodiments are possible within the spirit and the scope of the present invention.

What is claimed is:

1. A system for notifying a subscriber upon an occurrence of an event, the system comprising:
   a local event-generating system including a local server;
   a remote event-generating system including a notification request sender; and
   a notification server,
   wherein, when the event occurs in the local event-generating system, said local server detects the occurrence of the event and requests said notification server to notify the subscriber of the occurrence of the event, and
   wherein, when the event occurs in the remote event-generating system, said notification request sender detects the occurrence of the event, prepares a notification request according to an open network protocol and sends the notification request to the notification server, whereby said notification server notifies the subscriber of the occurrence of the event in response to receiving the notification request according to the open network protocol.

2. The system of claim 1, wherein the event is a messaging event, and at least one of said local event-generating system and said remote event-generating system is a messaging system.

3. The system of claim 2, wherein said messaging system is selected from the group consisting of e-mail and voice mail.

4. The system of claim 2, wherein said messaging system further comprises an API (application programming interface) for providing an interface for detecting the event by said notification request sender.

5. The system of claim 1, wherein the event is a non-messaging event, and at least one of said local event-generating system and said remote event-generating system is a non-messaging system.

6. The system of claim 1, wherein said notification server further comprises:
   an open network protocol server for receiving said notification request from said notification request sender; and
   a notification messaging server for receiving said notification request from said open network protocol server and for notifying the subscriber of the event according to said notification request.

7. The system of claim 6, wherein said open network protocol server is an FTP (File Transfer Protocol) server and said open network protocol is FTP.

8. The system of claim 6, wherein said open network protocol server is an SMTP (Simple Mail Transfer Protocol) server and said open network protocol is SMTP.

9. The system of claim 6, wherein said open network protocol server is an HTTP (Hyper-Text Transfer Protocol) server and said open network protocol is HTTP.

10. The system of claim 9, wherein said notification request sender further comprises:
 a notification event detector for detecting the event; and
 a notification protocol adapter for preparing and transmitting said notification request.

11. The system of claim 10, wherein said notification server further comprises a notification server protocol adapter for receiving said notification request and for determining validity of said notification request, such that if said notification request is valid, said notification server protocol adapter passes information from said notification request to said notification messaging server.

12. The system of claim 1, further comprising a network for connecting said notification request sender to said notification server.

13. The system of claim 12, wherein said network is the Internet.

14. The system of claim 13, wherein said local event-generating system is a messaging system for generating a message event, said messaging system notifying said notification server of said message event directly.

15. The system of claim 13, wherein said local event-generating system further comprises:
 a messaging system for generating a message event; and
 a notification request sender for sending a notification request to said notification server.

16. The system of claim 1, wherein the notification server selects a notification mechanism for notifying the subscriber based on at least one of a preference of the subscriber and the capabilities of a receiving device associated with the subscriber.

17. The system of claim 1, wherein the notification server determines a time for notifying the subscriber.

18. The system of claim 1, wherein the notification server determines whether to notify the subscriber of the occurrence of the event.

19. The system of claim 1, wherein the notification server forms a notification message for notifying the subscriber based on the type of event.

20. The system of claim 1, wherein the notification server forms a notification message for notifying the subscriber based on at least one of a preference of the subscriber and the capabilities of a receiving device associated with the subscriber.

21. A method for notifying a subscriber upon an occurrence of an event in a notification system including a local event-generating system having an local server, a remote event-generating system having a notification request sender, and a notification server, the method comprising:
 (a) when the event occurs in the local event-generating system, detecting the occurrence of the event by the local server and, requesting the notification server to notify the subscriber of the occurrence of the event; and
 (b) when the event occurs in the remote event-generating system, detecting the occurrence of the event by the notification request sender, preparing a notification request according to an open network protocol and transmitting said notification request from said notification request sender to said notification server according to said open network protocol, wherein said notification server notifies the subscriber of the occurrence of the event in response to receiving the notification request.

22. The method of claim 21, wherein said open network protocol is HTTP, and (b) further comprises preparing at least one HTTP key value pair for forming the notification message.

23. The method of claim 22, wherein said notification server is in communication with at least one associated messaging service for the subscriber, such that the subscriber is notified of the occurrence of the event through said associated messaging service.

24. The method of claim 23, further comprising determining a communication mode for notifying the subscriber.

25. The method of claim 24, further comprising determining a time for notifying the subscriber.

26. The method of claim 25, wherein said communication mode and said time are determined according to a preference of the subscriber.

27. The method of claim 21, further comprising:
 (c) sending a first acknowledgment message (ack) by said notification server upon receipt of said notification request.

28. The method of claim 27, further comprising:
 (d) sending a second ack message by said notification server upon notification of the subscriber.

29. The method of claim 28, wherein the notification request sender detects the occurrence of the event and sends said notification request, and wherein the notification request sender cannot send an additional notification request until at least said first ack message is received.

30. The method of claim 28, wherein said notification request features an identification tag, such that the notification request sender asynchronously sends an additional notification request without waiting for said first ack message, such that said first ack message includes said identification tag for identifying said notification request associated with said first ack message.

31. A system for notifying a subscriber upon an occurrence of an event, the system comprising:
 a local event-generating system including a local server;
 a first remote event-generating system including a first notification request sender;
 a second remote event-generating system including a second notification request sender; and
 a notification server,
 wherein one of the local server, the first notification request sender and the second notification request sender detects the occurrence of the event,
 wherein when the local server detects the occurrence of the event, the local server requests the notification server to notify the subscriber of the occurrence of the event,
 wherein when the first notification request sender detects the occurrence of the event, the first notification request sender prepares a first notification request according to a first open network protocol and the notification server notifies the subscriber of the occurrence of the event in response to receiving the first notification request according to the first open network protocol, and
 wherein when the second notification request sender detects the occurrence of the event, the second notification request sender prepares a second notification request according to a second open network protocol and the notification server notifies the subscriber of the occurrence of the event in response to receiving the second notification request according to the second open network protocol.

32. The system of claim 31, wherein said first open network protocol and said second open network protocol are the same open network protocol.

33. The system of claim 31, wherein said event is a messaging event.

34. The system of claim 31, wherein said event is a non-messaging event.

35. The system of claim 31, further comprising:
a third remote event-generating system including a third notification request sender, wherein when the third notification request sender detects the occurrence of the event, the third notification request sender prepares a third notification request according to a third open network protocol and the notification server notifies the subscriber of the occurrence of the event in response to receiving the third notification request according to the third open network protocol.

* * * * *